US012169784B2

(12) United States Patent
Neves et al.

(10) Patent No.: US 12,169,784 B2
(45) Date of Patent: Dec. 17, 2024

(54) ONLINE, INCREMENTAL REAL-TIME LEARNING FOR TAGGING AND LABELING DATA STREAMS FOR DEEP NEURAL NETWORKS AND NEURAL NETWORK APPLICATIONS

(71) Applicant: Neurala, Inc., Boston, MA (US)

(72) Inventors: Lucas Neves, Somerville, MA (US); Liam Debeasi, Brookline, MA (US); Heather Ames Versace, Milton, MA (US); Jeremy Wurbs, Worcester, MA (US); Massimiliano Versace, Milton, MA (US); Warren Katz, Cambridge, MA (US); Anatoli Gorchet, Newton, MA (US)

(73) Assignee: Neurala, Inc., Boston, MA (US)

( * ) Notice: Subject to any disclaimer, the term of this patent is extended or adjusted under 35 U.S.C. 154(b) by 0 days.

(21) Appl. No.: 17/818,015

(22) Filed: Aug. 8, 2022

(65) Prior Publication Data
US 2022/0383115 A1 Dec. 1, 2022

Related U.S. Application Data

(60) Division of application No. 16/572,808, filed on Sep. 17, 2019, now Pat. No. 11,410,033, which is a
(Continued)

(51) Int. Cl.
*G06N 3/084* (2023.01)
*G06F 16/2455* (2019.01)
(Continued)

(52) U.S. Cl.
CPC ....... *G06N 3/084* (2013.01); *G06F 16/24568* (2019.01); *G06F 16/5866* (2019.01);
(Continued)

(58) Field of Classification Search
CPC .......... G06N 3/084; G06N 3/08; G06N 3/045; G06N 5/01; G06N 20/10; G06F 16/24568;
(Continued)

(56) References Cited

U.S. PATENT DOCUMENTS 7,587,101 B1 9/2009 Bourdev
7,900,225 B2 3/2011 Lyon et al.
(Continued)

FOREIGN PATENT DOCUMENTS

CN 105718890 A 6/2016
CN 106203330 A 12/2016
(Continued)

OTHER PUBLICATIONS

Riesenhuber et al. "Models of object recognition." Nature Neuroscience 3.11 (2000): 1199-1204.
(Continued)

*Primary Examiner* — Michael S Osinski
(74) *Attorney, Agent, or Firm* — Smith Baluch LLP

(57) ABSTRACT

Today, artificial neural networks are trained on large sets of manually tagged images. Generally, for better training, the training data should be as large as possible. Unfortunately, manually tagging images is time consuming and susceptible to error, making it difficult to produce the large sets of tagged data used to train artificial neural networks. To address this problem, the inventors have developed a smart tagging utility that uses a feature extraction unit and a fast-learning classifier to learn tags and tag images automatically, reducing the time to tag large sets of data. The feature extraction unit and fast-learning classifiers can be implemented as artificial neural networks that associate a label with features extracted from an image and tag similar features from the image or other images with the same label. Moreover, the
(Continued)

smart tagging system can learn from user adjustment to its proposed tagging. This reduces tagging time and errors.

17 Claims, 7 Drawing Sheets

Related U.S. Application Data continuation of application No. PCT/US2018/023155, filed on Mar. 19, 2018.

(60) Provisional application No. 62/472,925, filed on Mar. 17, 2017.

(51) Int. Cl.
    *G06F 16/58*     (2019.01)
    *G06F 17/15*     (2006.01)
    *G06F 18/24*     (2023.01)
    *G06N 3/08*     (2023.01)
    *G06V 10/44*     (2022.01)
    *G06V 10/74*     (2022.01)
    *G06V 10/764*     (2022.01)
    *G06V 30/19*     (2022.01)
    *G06V 30/194*     (2022.01)

(52) U.S. Cl.
    CPC .............. *G06F 17/15* (2013.01); *G06F 18/24* (2023.01); *G06N 3/08* (2013.01); *G06V 10/454* (2022.01); *G06V 10/761* (2022.01); *G06V 10/764* (2022.01); *G06V 30/19133* (2022.01); *G06V 30/19167* (2022.01); *G06V 30/194* (2022.01)

(58) Field of Classification Search
    CPC ...... G06F 16/5866; G06F 17/15; G06F 18/24; G06F 18/22; G06F 18/2413; G06F 18/214; G06F 18/2178; G06V 10/454; G06V 10/761; G06V 10/764; G06V 30/19133; G06V 30/19167; G06V 30/194
    See application file for complete search history.

(56) References Cited

U.S. PATENT DOCUMENTS

| | | | |
|---|---|---|---|
| 8,165,407 | B1 | 4/2012 | Khosla et al. |
| 8,259,995 | B1 | 9/2012 | Schendel et al. |
| 9,361,943 | B2 | 6/2016 | Thrun |
| 9,589,595 | B2 | 3/2017 | Gao et al. |
| 9,626,566 | B2 | 4/2017 | Versace et al. |
| 9,754,190 | B1 | 9/2017 | Guttmann |
| 10,037,471 | B2 | 7/2018 | Satzoda et al. |
| 10,289,910 | B1* | 5/2019 | Chen ..................... G06N 3/084 |
| 10,503,976 | B2 | 12/2019 | Versace et al. |
| 10,789,291 | B1 | 9/2020 | Zadeh et al. |
| 11,410,033 | B2 | 8/2022 | Neves et al. |
| 2008/0201734 | A1 | 8/2008 | Lyon et al. |
| 2009/0144772 | A1 | 6/2009 | Fink et al. |
| 2011/0010388 | A1 | 1/2011 | MacLaurin |
| 2011/0029533 | A1 | 2/2011 | Jayakody et al. |
| 2012/0072215 | A1 | 3/2012 | Yu et al. |
| 2012/0194649 | A1 | 8/2012 | Javidi et al. |
| 2012/0269436 | A1 | 10/2012 | Mensink et al. |
| 2013/0022242 | A1 | 1/2013 | Cobb et al. |
| 2013/0216094 | A1 | 8/2013 | Delean |
| 2013/0242093 | A1 | 9/2013 | Cobb et al. |
| 2014/0050391 | A1 | 2/2014 | Angelova et al. |
| 2015/0070526 | A1 | 3/2015 | Kinoshita |
| 2015/0146991 | A1 | 5/2015 | Nakano et al. |
| 2015/0248586 | A1 | 9/2015 | Gaidon et al. |
| 2015/0254555 | A1 | 9/2015 | Williams, Jr. et al. |
| 2015/0269439 | A1 | 9/2015 | Versace et al. |
| 2015/0324686 | A1 | 11/2015 | Julian et al. |
| 2016/0005175 | A1 | 1/2016 | Fujita |
| 2016/0092751 | A1 | 3/2016 | Zavesky et al. |
| 2016/0140424 | A1 | 5/2016 | Wang et al. |
| 2016/0148079 | A1 | 5/2016 | Shen et al. |
| 2016/0379091 | A1* | 12/2016 | Lin ..................... G06V 10/776 382/156 |
| 2017/0032222 | A1 | 2/2017 | Sharma et al. |
| 2017/0039468 | A1 | 2/2017 | Zeiler |
| 2017/0039469 | A1 | 2/2017 | Majumdar et al. |
| 2017/0140236 | A1 | 5/2017 | Price et al. |
| 2017/0154246 | A1 | 6/2017 | Guttmann |
| 2017/0154269 | A1 | 6/2017 | Guttmann |
| 2017/0154273 | A1 | 6/2017 | Guttmann |
| 2017/0169567 | A1 | 6/2017 | Chefd'hotel et al. |
| 2017/0193298 | A1 | 7/2017 | Versace et al. |
| 2017/0304732 | A1* | 10/2017 | Velic ..................... A63H 33/08 |
| 2018/0053530 | A1 | 2/2018 | Moore et al. |
| 2018/0091832 | A1 | 3/2018 | Zeiler et al. |
| 2018/0136332 | A1 | 5/2018 | Barfield, Jr. et al. |
| 2018/0150694 | A1 | 5/2018 | Guttmann |
| 2018/0150695 | A1 | 5/2018 | Guttmann |
| 2018/0150697 | A1 | 5/2018 | Guttmann et al. |
| 2018/0150698 | A1 | 5/2018 | Guttmann et al. |
| 2018/0336479 | A1 | 11/2018 | Guttmann |
| 2018/0373980 | A1 | 12/2018 | Huval |
| 2019/0279046 | A1 | 9/2019 | Han et al. |
| 2019/0385023 | A1* | 12/2019 | Li ..................... G06V 10/774 |
| 2020/0151446 | A1 | 5/2020 | Versace et al. |

FOREIGN PATENT DOCUMENTS

| | | |
|---|---|---|
| GB | 2491987 B | 3/2013 |
| JP | 2015106197 A | 6/2015 |
| WO | 2018170512 A1 | 9/2018 |

OTHER PUBLICATIONS

Rolfes "Artificial neural networks on programmable graphics hardware." Game Programming Gems 4 (2004): 373-378.

Rublee et al. "ORB: An efficient alternative to SIFT or SURF." 2011 International Conference on Computer Vision. IEEE 2011, 2564-2571.

Ruesch et al. "Multimodal saliency-based bottom-up attention a framework for the humanoid robot icub." 2008 IEEE International Conference on Robotics and Automation. IEEE, 2008, pp. 962-965.

Rumelhart "Learning internal representations by error propagation, in parallel distributed processing." Explorations in the Microstructure of Cognition (1986): 318-362.

Rumpf et al. "Graphics processor units: New prospects for parallel computing." Numerical solution of partial differential equations on parallel computers. Springer, Berlin, Heidelberg, 2006. 89-132.

Salakhutdinov et al. (2009). Deep Boltzmann machines. In International Conference on Artificial Intelligence and Statistics (pp. 448-455).

Schaul et al. "Prioritized experience replay." arXiv preprint arXiv:1511. 05952 (2015). 21 pages.

Scherreik et al. "Automatic threshold selection for multi-class open set recognition." Automatic Target Recognition XXVII. vol. 10202. SPIE, 2017 9 pages.

Schmidhuber "Curious model-building control systems." Proc. International Joint Conference on Neural Networks. 1991.pp. 1458-1463.

Schmidhuber "Formal theory of creativity, fun, and intrinsic motivation (1990-2010)." IEEE Transactions on Autonomous Mental Development 2.3 (2010): 230-247.

Seibert et al. "Adaptive 3-D object recognition from multiple views." IEEE Transactions on Pattern Analysis & Machine Intelligence 14.02 (1992): 107-124.

Sherbakov Computational principles for an autonomous active vision system. Diss. Boston University, 2014, 194 pages.

Sherbakov et al. "A computational model of the role of eye-movements in object disambiguation." Cosyne, 2013, 2 pages.

Sherbakov et al. "CogEye: An online active vision system that disambiguates and recognizes objects." Poster session presented at

(56) References Cited

OTHER PUBLICATIONS the Neuromorphic and Brain-Based Computing Systems (NeuComp) Conference. Grenoble, France. 2013, 2 pages.
Smolensky, Information processing in dynamical systems: Foundations of harmony theory. University of Colorado at Boulder, Dept of Computer Science, 1986. 88 pages.
Sneider et al. "From synapses to circuitry: Using memristive memory to explore the electronic brain." Computer 44.2 (2011): 21-28.
Spratling "Predictive coding as a model of biased competition in visual attention." Vision Research 48.12 (2008): 1391-1408.
Spratling "Unsupervised learning of generative and discriminative weights encoding elementary image components in a predictive coding model of cortical function." Neural Computation 24.1 (2012): 60-103.
Spratling et al. "Unsupervised learning of overlapping image components using divisive input modulation." Computational Intelligence and Neuroscience 2009 (2009), 20 pages.
Sprekeler "On the relation of slow feature analysis and laplacian eigenmaps." Neural Computation 23.12 (2011): 3287-3302.
Sun et al. "Recognition of SAR target based on multilayer auto-encoder and SNN." International Journal of Innovative Computing, Information and Control 9.11 (2013): 4331-4341.
Sutton, R. S., and Barto, A. G. (1998). Reinforcement learning: An introduction(vol. 1, No. 1). Cambridge: MIT Press. 10 pages.
Tong et al. "Reciprocal-wedge transform for space-variant sensing." IEEE Transactions on Pattern Analysis and Machine Intelligence 17.5 (1995): 500-511.
Torralba et al. "Contextual guidance of eye movements and attention in real-world scenes: the role of global features in object search." Psychological Review 113.4 (2006): 766-786.
Van Hasselt et al. "Deep Reinforcement Learning with Double Q-learning." arXiv preprint arXiv:1509.06461 (2015), 7 pages.
Versace (2006) From spikes to interareal synchrony: how attentive matching and resonance control learning and information processing by laminar thalamocortical circuits. NSF Science of Learning Centers PI Meeting, Washington, DC, USA. 1 page.
Versace "Open-source software for computational neuroscience: Bridging the gap between models and behavior." Horizons in Computer Science Research 3 (2010): 43 pages.
Versace Brain-inspired computing. Invited keynote address, Bionetics, Boston, MA, 2010, 1 page.
Versace et al. "KInNeSS: A modular framework for computational neuroscience." Neuroinformatics 6.4 (2008): 291-309.
Versace et al. "The brain of a new machine." IEEE Spectrum 47.12 (2010): 30-37.
Versace, TEDx Fulbright, "Invited talk." Washington DC, Apr 5 (2014): 30 pages.
Webster et al. "Connections of inferior temporal areas TEO and TE with parietal and frontal cortex in macaque monkeys." Cerebral Cortex 4.5 (1994): 470-483.
Wiskott et al. "Slow feature analysis: Unsupervised learning of invariances." Neural Computation 14.4 (2002): 715-770.
Wu et al. "A simulation study of deep belief network combined with the self-organizing mechanism of adaptive resonance theory." 2010 International Conference on Computational Intelligence and Software Engineering. IEEE, 2010, 4 pages.
Yu et al. "Leveraging knowledge-based inference for material classification." Proceedings of the 23rd ACM International Conference on Multimedia. 2015, 4 pages.
Adaptive resonance theory, Wikipedia Apr. 30, 2017. Accessed at https://en.wikipedia.org/wiki/Adaptive_resonance_theory on Jan. 22, 2021. 4 pages.
Adelson et al. "Pyramid methods in image processing." RCA Engineer 29.6 (1984): 33-41.
Aggarwal et al. "On the surprising behavior of distance metrics in high dimensional space." International Conference on Database Theory. Springer, Berlin, Heidelberg, 2001, 15 pages.
Al-Kaysi et al. "A multichannel deep belief network for the classification of EEG data." International Conference on Neural Information Processing. Springer, Cham, 2015, 8 pages.
Ames et al. "Persuading computers to act more like brains." Advances in Neuromorphic Memristor Science and Applications. Springer, Dordrecht, 2012. 37-61.
Ames et al. "The animat: New frontiers in whole brain modeling." IEEE Pulse 3.1 (2012): 47-50.
Apolloni et al. "Training a network of mobile neurons." The 2011 International Joint Conference on Neural Networks. IEEE, 2011, 9 pages.
Artificial Intelligence as a Service. Invited talk, Defrag, Broomfield, CO, Nov. 4-6, 2013. 22 pages.
Athiwaratkun et al., "Feature representation in convolutional neural networks." arXiv preprint arXiv:1507.02313 (2015). 6 pages.
Attari et al. "Nazr-CNN: object detection and fine-grained classification in crowdsourced UAV images." IEEE International Conference on Data Science and Advanced Analytics (DSAA). 2016. 9 pages.
Baraldi et al. "Constructive Feedforward ART Clustering Networks—Part I." IEEE Transactions on Neural Networks 13.3 (2002), 645-661.
Baraldi et al. "Fuzzy combination of Kohonen's and ART neural network models to detect statistical regularities in a random sequence of multi-valued input patterns." Proceedings of International Conference on Neural Networks (ICNN'97). vol. 1. IEEE, 1997, 6 pages.
Baraldi et al. Constructive feedforward ART clustering networks—Part II. IEEE Transactions on Neural Networks, 13 (3), 2002, 662-677.
Baraldi et al. Simplified Art: A new class of ART algorithms. International Computer Science Institute, Berkeley, CA, TR-98-004, 1998. 42 pages.
Bendale et al. "Towards open set deep networks." Proceedings of the IEEE Conference on Computer Vision and Pattern Recognition. 2016 (10 pages).
Bengio et al. Representation learning: A review and new perspectives, IEEE Transactions on Pattern Analysis and Machine Intelligence, vol. 35 Issue 8, 2013. pp. 1798-1828 .
Bernhard et al. Spiking Neurons on GPUs. Tech. Rep. 05-15, Ecole Nationale des Ponts et Chauss'es, 2005, 8 pages.
Besl et al. "Three-dimensional object recognition." ACM Computing Surveys (CSUR) 17.1 (1985): 75-145.
Boddapati Classifying Environmental Sounds with Image Networks, Thesis, Faculty of Computing Blekinge Institute of Technology, 2017, 37 pages.
Bohn "Kohonen feature mapping through graphics hardware." Proceedings of the Joint Conference on Information Sciences. vol. 2. 1998, 4 pages.
Bradski et al. "Fast-learning VIEWNET architectures for recognizing three-dimensional objects from multiple two-dimensional views." Neural Networks 8.7-8 (1995): 1053-1080.
Canny (1986). Computational Approach To Edge Detection, IEEE Trans. Pattern Analysis and Machine Intelligence, 8 (6):679-698.
Carpentar et al. "A massively parallel architecture for a self-organizing neural pattern recognition machine." Computer Vision, Graphics, and Image Processing 37.1 (1987): 54-115.
Carpenter et al. (1995). Adaptive resonance theory (ART). In M. Arbib (Ed.), The handbook of brain theory and neural networks. (pp. 79-82). Cambridge, M.A.: MIT Press.
Carpenter et al. The art of adaptive pattern recognition by a self-organizing neural network. Computer, 21(3):77-88, 1988.
Carpenter et al., Fuzzy ART: Fast stable learning and categorization of analog patterns by an adaptive resonance system. Neural Networks 4, 759-771 1991.
Chilimbi et al., "Project adam: Building an efficient and scalable deep learning training system." 11th {USENIX} Symposium on Operating Systems Design and Implementation ({OSDI} 14). 2014. 13 pages.
Coifman et al. "Diffusion wavelets." Applied and Computational Harmonic Analysis 21.1 (2006): 53-94.
Coifman, R.R., Lafon, S., Lee, A.B., Maggioni, M., Nadler, B., Warner, F., and Zucker, S.W. Geometric diffusions as a tool for

(56) References Cited

OTHER PUBLICATIONS harmonic analysis and structure definition of data: Diffusion maps. Proceedings of the National Academy of Sciences of the United States of America, 102(21):7426, 2005. 21 pages.
Davis Graphics processing unit computation of neural networks. Diss. University of New Mexico, 2005, 121 pages.
Dosher et al. "Mechanisms of perceptual attention in precuing of location." Vision Research 40.10-12 (2000): 1269-1292.
Ellias et al. "Pattern formation, contrast control, and oscillations in the short term memory of shunting on-center off-surround networks." Biological Cybernetics 20.2 (1975): 69-98.
European Office Action in European Application No. 18767344.7 dated Nov. 16, 2022, 7 pages.
Extended European Search Report in European Patent Application No. 18767344.7 dated Dec. 10, 2020, 9 pages.
Extended European Search Report in European Patent Application No. 18799281.3 dated Feb. 4, 2021. 9 pages.
Fazl et al. (2009). "View-invariant object category learning, recognition, and search: How spatial and object attention are coordinated using surface-based attentional shrouds." Cognitive Psychology 58.1 (2009): 1-48.
Földiák "Forming sparse representations by local anti-Hebbian learning." Biological Cybernetics 64.2 (1990): 165-170.
Friston et al. "Perceptions as hypotheses: saccades as experiments." Frontiers in Psychology 3 (2012): 151, 1-20.
Galbraith et al. "A neural network-based exploratory learning and motor planning system for co-robots." Frontiers in Neurorobotics 9 (2015): 7, 10 pages.
George et al. "Towards a mathematical theory of cortical micro-circuits." PLoS Computational Biology 5.10 (2009): e1000532, 1-26.
Georgii et al. "Mass-spring systems on the GPU." Simulation Modelling Practice and Theory 13.8 (2005): 693-702.
Gorchetchnikov An approach to a biologically realistic simulation of natural memory. Diss. Middle Tennessee State University, 2000, 70 pages.
Gorchetchnikov et al. "A biophysical implementation of a bidirectional graph search algorithm to solve multiple goal navigation tasks." Connection Science 17.1-2 (2005): 145-164.
Gorchetchnikov et al. "A model of STDP based on spatially and temporally local information: Derivation and combination with gated decay." Neural Networks 18.5-6 (2005): 458-466.
Gorchetchnikov et al. "A simple rule for spike-timing-dependent plasticity: local influence of AHP current." Neurocomputing 65 (2005): 885-890.
Gorchetchnikov et al. "Spatially and temporally local spike-timing-dependent plasticity rule." Proceedings. 2005 IEEE International Joint Conference on Neural Networks, 2005.. vol. 1. IEEE, 2005, 7 pages.
Grabner et al. "Real-time tracking via on-line boosting." Bmvc. vol. 1. No. 5. 2006, 10 pages.
Grossberg "Contour Enhancement, Short Term Memory, and Constancies in Reverberating Neural Networks." Studies in Applied Mathematics 52.3 (1973): 213-257.
Grossberg et al. "Spikes, synchrony, and attentive learning by laminar thalamocortical circuits." Brain Research 1218 (2008): 278-312.
Grossberg et al. "ARTSCENE: A neural system for natural scene classification." Journal of Vision 9.4 (2009): 6-6, 19 pages.
Hagen et al. "Visual simulation of shallow-water waves." Simulation Modelling Practice and Theory 13.8 (2005): 716-726.
Hasselt "Double Q-learning." Advances in Neural Information Processing Systems 23 (2010), pp. 2613-2621.
Hinton et al. "A fast learning algorithm for deep belief nets." Neural Computation 18.7 (2006): 1527-1554.
Hodgkin et al. "A quantitative description of membrane current and its application to conduction and excitation in nerve." The Journal of Physiology 117.4 (1952): 500-544.
Hopfield "Neural networks and physical systems with emergent collective computational abilities." Proceedings of the National Academy of Sciences 79.8 (1982): 2554-2558.
Ilie, 2002. Optical character recognition on graphics hardware. Tech. Rep. integrative paper, UNCCH, Department of Computer Science, 9 pages.
International Search Report and Written Opinion in International Patent Application No. PCT/US2018/023155 mailed Jul. 30, 2018, 19 pages.
International Search Report and Written Opinion in International Patent Application No. PCT/US2018/031833 mailed Aug. 31, 2018, 16 pages.
International Search Report and Written Opinion mailed Aug. 31, 2018 from International Application No. PCT/US2018/031833, 12 pages.
Itti et al. "A model of saliency-based visual attention for rapid scene analysis." IEEE Transactions on Pattern Analysis and Machine Intelligence 20.11 (1998): 1254-1259.
Itti et al. (2001). "Computational modelling of visual attention." Nature Reviews Neuroscience 2.3 (2001): 194-203.
Japanese Office Action and English Translation thereof in Japanese App. No. 2019-551365 dated Mar. 25, 2022 8 pages.
Jarrett et al. "What is the best multi-stage architecture for object recognition?." 2009 IEEE 12th International Conference on Computer Vision. IEEE, 2009, pp. 2146-2153.
Kalal et al. "Forward-backward error: Automatic detection of tracking failures." 2010 20th International Conference on Pattern Recognition. IEEE, 2010 4 pages.
Kasaei et al., "An interactive open-ended learning approach for 3d object recognition." 2014 IEEE international conference on autonomous robot systems and competitions (ICARSC). IEEE, 2014. 6 pages.
Khaligh-Razavi et al., "Deep supervised, but not unsupervised, models may explain IT cortical representation." PLoS computational biology 10.11 (2014): e1003915, 29 pages.
Kim "Novel approaches to clustering, biclustering and algorithms based on adaptive resonance theory and intelligent control," Doctoral Dissertations, Missouri University of Science and Technology, 125 pages (2016).
Kipfer et al. "Uberflow: A GPU-based particle engine." Proceedings of the ACM SIGGRAPH/EUROGRAPHICS Conference on Graphics Hardware. 2004, pp. 115-122.
Kolb et al. "Hardware-based simulation and collision detection for large particle systems." Proceedings of the ACM SIGGRAPH/EUROGRAPHICS Conference on Graphics Hardware. 2004.pp. 123-131.
Kompella et al. "Incremental slow feature analysis: Adaptive low-complexity slow feature updating from high-dimensional input streams." Neural Computation 24.11 (2012): 2994-3024.
Kowler "Eye movements: The past 25 years." Vision Research 51.13 (2011): 1457-1483.
Krizhevsky et al. "Imagenet classification with deep convolutional neural networks." Communications of the ACM 60.6 (2017): 84-90.
Larochelle et al. "Learning to combine foveal glimpses with a third-order Boltzmann machine." Advances in Neural Information Processing Systems 23 (2010) 1243-1251.
Lecun et al. "Convolutional networks and applications in vision." Proceedings of 2010 IEEE International Symposium on Circuits and Systems. IEEE, 2010, 253-256.
Lee et al. "Learning the parts of objects by non-negative matrix factorization." Nature 401.6755 (1999): 788-791.
Lee et al. "Unsupervised learning by convex and conic coding." Advances in Neural Information Processing Systems 9 (1996), 7 pages.
Lee, et al. "Dual-Memory Deep Learning Architectures for Lifelong Learning of Everyday Human Behaviors." IJCAI. 2016 (7 pages).
Legenstein et al. "Reinforcement learning on slow features of high-dimensional input streams." PLoS Computational Biology 6.8 (2010): e1000894, 13 pages.
Leveille et al. (2010) Learning in a distributed software architecture for large-scale neural modeling. BIONETICS10, Boston, MA, USA. 8 pages.

(56) References Cited

OTHER PUBLICATIONS

Livitz et al. "Adaptive, brain-like systems give robots complex behaviors." The Neuromorphic Engineer 10.1201101.003500 (2011): 3 pages.
Livitz et al. "Visually-guided adaptive robot (ViGuAR)." The 2011 International Joint Conference on Neural Networks. IEEE, 2011, 9 pages.
Lowe "Distinctive image features from scale-invariant keypoints." International Journal of Computer Vision 60.2 (2004): 91-110.
Lu et al. "Modeling mechanisms of perceptual learning with augmented Hebbian re-weighting." Vision Research 50.4 (2010): 375-390.
Mahadevan "Proto-value functions: Developmental reinforcement learning." Proceedings of the 22nd International Conference on Machine Learning. 2005, pp. 553-560.
Meuth et al. "A survey of neural computation on graphics processing hardware." 2007 IEEE 22nd International Symposium on Intelligent Control. IEEE, 2007, 5 pages.
Mishkin et al. "Contribution of striate inputs to the visuospatial functions of parieto-preoccipital cortex in monkeys." Behavioural Brain Research 6.1 (1982): 57-77.
Mnih et al. "Human-level control through deep reinforcement learning." Nature 518.7540 (2015): 529-533.
Moore et al. "Prioritized sweeping: Reinforcement learning with less data and less time." Machine Learning 13.1 (1993): 103-130.
Najemnik et al. "Simple summation rule for optimal fixation selection in visual search." Vision Research 49.10 (2009): 1286-1294.
Nebehay et al. "Consensus-based matching and tracking of keypoints for object tracking." IEEE Winter Conference on Applications of Computer Vision. IEEE, 2014. 8 pages.
Nebehay, Robust object tracking based on tracking-learning-detection. Masters Thesis, Faculty of Informatics, TU Vienna 2012. (60 pages).
Oh et al. 2004. GPU implementation of neural networks. Pattern Recognition 37, pp. 1311-1314.
Oja "Simplified neuron model as a principal component analyzer." Journal of Mathematical Biology 15.3 (1982): 267-273.
Papadopoulos et al. "We don't need no bounding-boxes: Training object class detectors using only human verification." Apr. 2017 (Year: 2017) arXiv 10 pages.
Platt "Probabilistic outputs for support vector machines and comparisons to regularized likelihood methods." Advances in Large Margin Classifiers 10.3 (1999): 61-74.
Raijmakers et al. "Exact ART: A complete implementation of an ART network." Neural Networks 10.4 (1997): 649-669.
Ranzato et al. "Unsupervised learning of invariant feature hierarchies with applications to object recognition." 2007 IEEE Conference on Computer Vision and Pattern Recognition. IEEE, 2007, pp. 1-8.
Raudies et al. "Learning to navigate in a virtual world using optic flow and stereo disparity signals." Artificial Life and Robotics 19.2 (2014): 157-169.
Ren, et al."Ensemble classification and regression-recent developments, applications and future directions." IEEE Computational Intelligence Magazine 11.1 (2016): 41-53.
Riesenhuber et al. "Hierarchical models of object recognition in cortex." Nature Neuroscience 2.11 (1999): 1019-1025.
Office Action and Search Report with translation in Chinese Application No. 201880032375.2 dated Apr. 24, 2023, 17 pages.
Japanese Office Action with translation for Japanese App. No. 2023-042142 dated Jan. 5, 2024, 9 pages.
Second Office Action with translation in Chinese Application No. 201880032375.2 dated Jan. 25, 2024, 14 pages.
Examiner's Report in Canadian App. No. 3056884 dated Jun. 7, 2024, 3 pages.
Office Action (Rejection) with translation in Chinese Application No. 201880032375.2 dated Jun. 14, 2024, 16 pages.
Japanese Office Action with translation for Japanese App. No. 2023-042142 dated Aug. 23, 2024, 14 pages.

\* cited by examiner

ONLINE, INCREMENTAL REAL-TIME LEARNING FOR TAGGING AND LABELING DATA STREAMS FOR DEEP NEURAL NETWORKS AND NEURAL NETWORK APPLICATIONS

CROSS-REFERENCE TO RELATED PATENT APPLICATION(S)

This application is a divisional application of U.S. application Ser. No. 16/572,808, which was filed on Sep. 17, 2019, and which is a bypass continuation application of International Application No. PCT/US2018/023155, which was filed on Mar. 19, 2018, and which claims the priority benefit, under 35 U.S.C. § 119(e), of U.S. Application No. 62/472,925, which was filed on Mar. 17, 2017. Each of these applications is incorporated herein by reference in its entirety.

BACKGROUND

Traditional Deep Neural Networks (DNNs), including Convolutional Neural Networks (CNNs) that include many layers of neurons interposed between the input and output layers, require thousands or millions of iteration cycles over a particular dataset to train. Before this training takes place all the images in the dataset must be tagged by a human user. The process of tagging can involve labeling the whole image for classification or labeling individual areas of each image as particular objects for classification and detection/segmentation of individual objects.

Conventional image tagging is slow and tedious process. A human looks at a picture on a computer, tablet, or smartphone; identifies one or more objects in the picture; and tags those objects with descriptive tags (e.g., "tree," "house," or "car"). Major difficulties of manually tagging objects of interest include slow speed and susceptibility to human errors caused by distractions and tiredness. These issues create two types of problem: data preparation for training takes time that can become unacceptably long anywhere outside of academic setting, and the quality of tagging directly affects the quality of the subsequent learning as badly tagged data will not allow DNN to reach acceptable performance criteria.

SUMMARY

Embodiments of the present technology include methods and systems for tagging a sequence of images. An example method comprises tagging, by a user via a user interface, a first instance of a representation of an object in a first image in a sequence of images. At least one processor learns the representation of the object tagged by the user in the first image and tags a second instance of the representation of the object in the sequence of images. The user performs an adjustment of a tag and/or position of the second instance of the representation of the object created by the processor(s). And the processor based on the adjustment, a third instance of the representation of the object in the sequence of images.

The second instance of the representation of the object can be in the first image in the sequence of images or in another image in the sequence of images.

In some, the user may perform an adjustment of a tag and/or position of the third instance of the representation of the object created by the processor(s), and the processor tags a fourth instance of the representation of the object in the sequence of images based on the adjustment of a tag and/or position of the third instance of the representation of the object.

Examples of this method may also include classifying, via a fast learning classifier running on the processor(s), the representation of the object tagged by the user in the first image. In this case, tagging the third instance of the representation of the object may comprise extracting a convolutional output representing features of the third instance of the representation of the object with a neural network operably coupled to the fast learning classifier. The fast learning classifier classifies the third instance of the representation of the object based on the convolutional output.

Examples of this method may also include tagging the second instance of the representation by extracting, with a neural network running on the processor(s), a convolutional output representing features of the second instance of the representation of the object and classifying, with a classifier operably coupled to the neural network, the second instance of the representation of the object based on the convolutional output.

A system for tagging a sequence of images may include a user interface and at least one processor operably coupled to the user interface. In operation, the user interface enables a user to tag a first instance of a representation of an object in a first image in the sequence of images. And the processor learns the representation of the object tagged by the user in the first image and tags a second instance of the representation of the object in the sequence of image. The user interface enables the user to perform an adjustment of a tag and/or position of the second instance of the representation of the object created by the at least one processor and the processor(s) tag(s) a third instance of the representation of the object in the sequence of images based on the adjustment.

Other embodiments of the present technology include methods and systems for tagging an object in a data stream. An example system comprises a least one processor configured to implement a neural network and a fast learning module and a user interface operably coupled to the processor(s). In operation, the neural network extract a first convolutional output from a data stream that includes at least two representations of a first category of object. This first convolutional output represents features of a first representation of the first category of object. The fast learning module classifies the first representation into the first category based on the first convolutional output and learns a tag and/or a position of the first representation of the object based on an adjustment by a user. And the user interface displays the tag and/or the position for the first representation and enables the user to perform the adjustment of the tag and/or the position of the first representation.

In some cases, the tag is a first tag and the position is a first position. In these cases, the neural network may extract a second convolutional output from the data stream. This second convolutional output representing features of a second representation of the first category of object. And in these cases, the classifier classifies the second representation into the first category based on the second convolutional output and the adjustment of the tag and/or the position for the first representation. The user interface may display a second tag and/or a second position based on the first category.

If desired, the classifier can determine a confidence value that the tag and/or position of the first representation are correct. The user interface may display the confidence value to the user.

In cases where the object is a first object and the tag is a first tag, the classifier can learn a second tag for a second category of object represented in the data stream. In these cases, the neural network can extract a subsequent convolutional output from a subsequent data stream that includes at least one other representation of the second category of object. This subsequent convolutional output represents features of the other representation of the second category of object. The classifier classifies the other representation of the second category of object into the second category based on the subsequent convolutional output and the second tag. And the user interface displays the second tag. In these cases, the neural network may extract the first convolutional output by generating a plurality of segmented sub-areas of a first image in the data stream and encoding each of the plurality of segmented sub-areas.

Yet another embodiment of the present technology includes a method of tagging a plurality of instances of an object. An example of this method includes using a feature extraction module to extract a first feature vector representing a first instance of the object in the plurality of instances. A user tags the first instance of the object with a first label via a user interface. A classifier module associates the first feature vector with the first label. The feature extraction module extracts a second feature vector representing a second instance of the object in the plurality of instances. The classifier module computes a distance of between the first feature vector and the second feature vector, performs a comparison of the difference to a predefined threshold, and classifies the second instance of the object based on the comparison. If desired, the second instance of the object may be tagged with the first label based on the comparison. And the classifier module may determine a confidence of the classifying based on the comparison.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3 shows a screenshot of example implementation after the user tags a first instance of the first object.

FIG. 4 shows a screenshot of example implementation after the system has learned from the previous step and made suggestions to the user for tagging a second instance of the first object.

DETAILED DESCRIPTION

The power of backpropagation-based Neural Networks, including Deep Neural Networks and Convolutional Neural Networks, relies on the availability of a large amount of training and testing data to develop and then validate the performance of these architectures. However, producing large quantities of labeled or tagged data is a manual, cumbersome, and costly process.

This application pertains to automatically tagging, annotating, or labeling objects of interest to be identified and located in data streams (e.g., red-green-blue (RGB) images, point cloud data, IR images, hyperspectral images, or a combination of these or other data). One use of these tagged data streams is creating training and ground truth data to be utilized in training and testing of supervised Neural Networks, including backpropagation-based Deep Neural Networks that use thousands of images for proper training. The terms "annotating," "labeling," and "tagging" are used interchangeably in this document. The term "fast learning" is used in this application to describe methods that unlike backpropagation can be updated incrementally, e.g., from a single example, without needing to retrain the entire system on (all of) the previously presented data. Fast learning is contrasted with "batch" training, which involves the iterative presentation of a large corpus of data to learn even a single new instance of an object.

The technology described herein accelerates and improves the accuracy of manually labelling data by introducing an automated, real-time, fast learning step. This fast learning proposes a candidate tag for subsequent appearances of a tagged item, either in the same image with the first instance of the tagged item, in subsequent images, or both. Conversely, current techniques to tag data rely on a human labeling each object of interest in each frame (e.g., frames in a video stream).

Inventive methods introduce interactive assistance to the user. This interactive assistance comes in the form of an a Neural-Network-based automatic assistant, also called a smart tagging system or utility, with the ability to quickly learn the new tags during the process of human labeling the data. The automatic assistant labels or suggests labels for new data, receives corrections from the user for its suggested labels, and iteratively refines the quality of automatic labeling as the user continues to correct possible mistakes made by automatic assistant. This has the benefit that the system takes more and more work on itself and away from the user as it learns, allowing the user to concentrate on new objects of interest and verification of automatic tags. As a result, the tagging process becomes faster as more images are processed. Our studies have shown up to 40% tagging speed improvement for naïve human taggers—in other words, assisted tagging with an inventive smart tagging utility is 40% that manual tagging for someone who has never tagged images before.

Figure 1A:
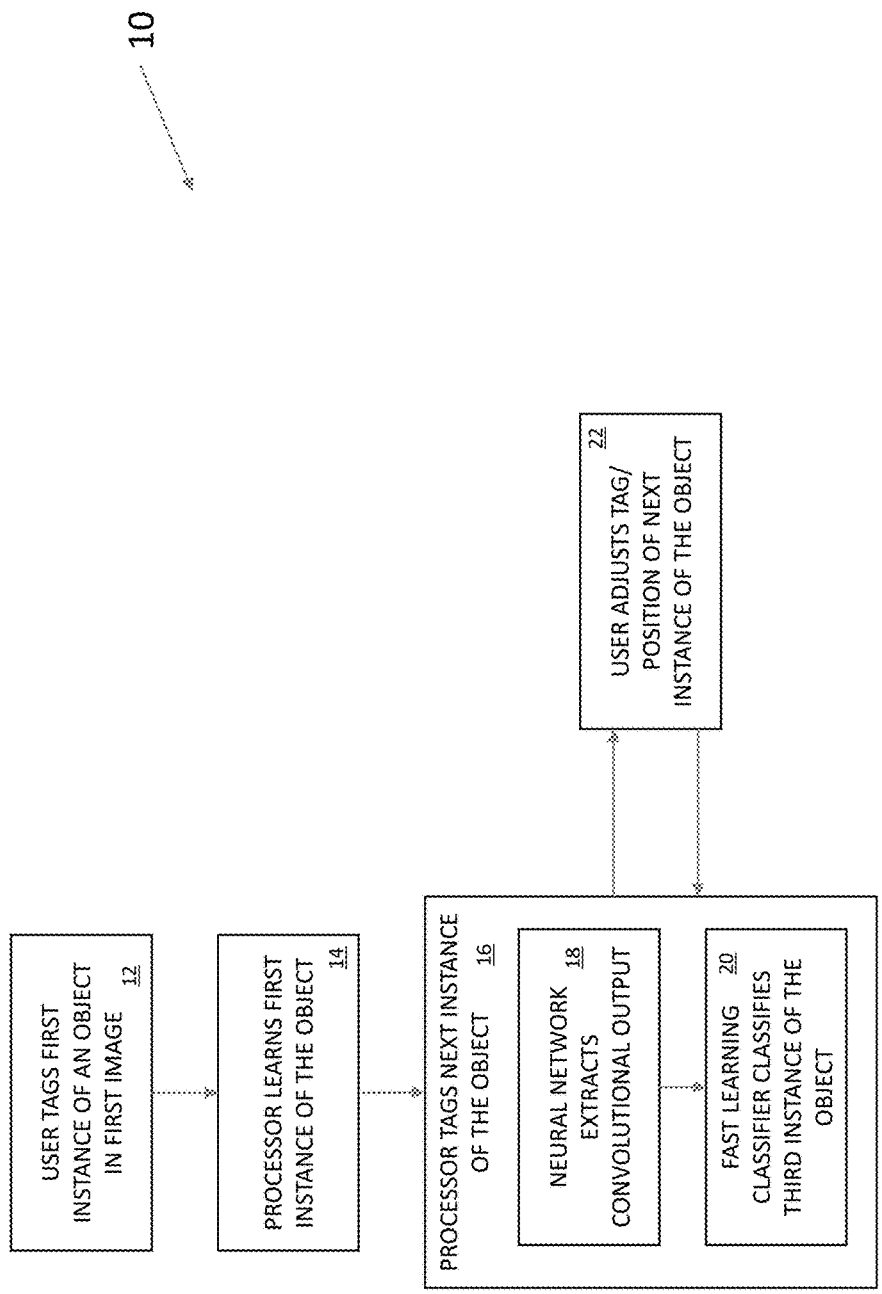
FIG. 1A shows a process for online, incremental real-time learning for tagging and labeling data streams with a processor-implemented convolutional neural network and fast learning classifier.

FIG. 1A shows an example of this tagging process 10:

1. The user tags a first instance of an object in frame 1 (e.g., at 12 in FIG. 1A). For instance, the user can draw a bounding polygon and can tag an object on frame 1, e.g., a tree.
2. A classifier running on one or more processors of a smart tagging utility learns the first instance of the object (e.g., at 14 in FIG. 1A) by associating features representing the tagged object with the tag defined by the user. In the example in step 1 (tagging a tree), the classifier learns the tree immediately after the tagging.
3. The processor(s) can tag subsequent instances of the object (e.g., at 16 in FIG. 1A). For instance, a convolutional neural network executed by the processor(s) can extract features from the frame (e.g., at 18 in FIG. 1A). The classifier classifies the extracted features based on their similarity to extracted features associated with user-defined tags (e.g., at 20 in FIG. 1A). For example, the processor can tag other trees in frame 1. Put differently, the neural network extracts features of other trees from frame 1 and the classifier classifies them appropriately. Each tree has a confidence value associated with bounding polygon, and may be distinguished from other, manually labeled objects via some visual indication (e.g., color of the bounding polygon, dotted vs. dashed bounding polygon outlines, etc.). Confidence values can be assigned by several methods for classification or tracking of object of interest, where the confidence could be, for instance, a scalar between 0 and 1, where 1 indicates absolute confidence that the object of interest belongs to a specific class. A particular object could have a distribution of probabilities associated with hierarchy of classes. For instance, an object could be classified as a tree and as a plant simultaneously.
4. If desired, at 22, the user adjusts the labels or edits the position or shape of the machine-generated bounding polygons in frame 1, and the classifier utilizes fast learning to update its knowledge and updates the proposals for objects in frame 1 not yet verified by the user. This can automatically update tagged objects in frame 1, if desired, until the objects are tagged satisfactorily in frame 1.
5. The user loads frame 2.
6. The smart tagging utility automatically tags objects learned in frame 1 if they appear in frame 2. Said another way, the smart tagging utility automatically tags objects by taking into account user adjustments if any on the tags in frame 1 to tag objects in frame 2.
7. If desired, the user adds new objects that were not present in frame 1, or proceeds to the next frame and in either case the process described in steps 1-7 repeats until desired objects in provided images are tagged or the user terminates the process.

This method can be applied to any area of interest, such as: rectangular, polygonal, or pixel-based tagging. In polygonal or pixel-based tagging, the silhouette of the object is delineated, rather than an area of the image, increasing the 'pixel on target' count with respect to a rectangular or polygonal tag where areas of the background may be included in the object being tagged.

A variety of techniques can be employed to introduce the fast learning architecture, including, for example, but not limited to:

- a combination of a DNN with a fast classifier, such as another Neural Network, a Support Vector Machine, or a Decision Tree, where the DNN provides a feature set to serve as an input to the fast classifier;
- a feature detection and tracking process that can be quickly initialized on the target subset of the image (e.g., a keypoint tracker); and
- any combination of the aforementioned techniques.

The present technology enables efficient and cost-effective preparation of datasets for training of backpropagation-based Neural Networks, especially DNNs, and, more generally, streamlines learning in parallel, distributed systems of equations that perform data analysis for purposes, such as controlling autonomous cars, drones, or other robots in real time.

More particularly, examples of the present technology improve or replace the processes of manually tagging each occurrence of a specific object in a data stream (e.g., a frame) or sequences of frames and of optimally selecting the objects by reducing the manual labor and costs associated with dataset preparation.

Figure 1B:
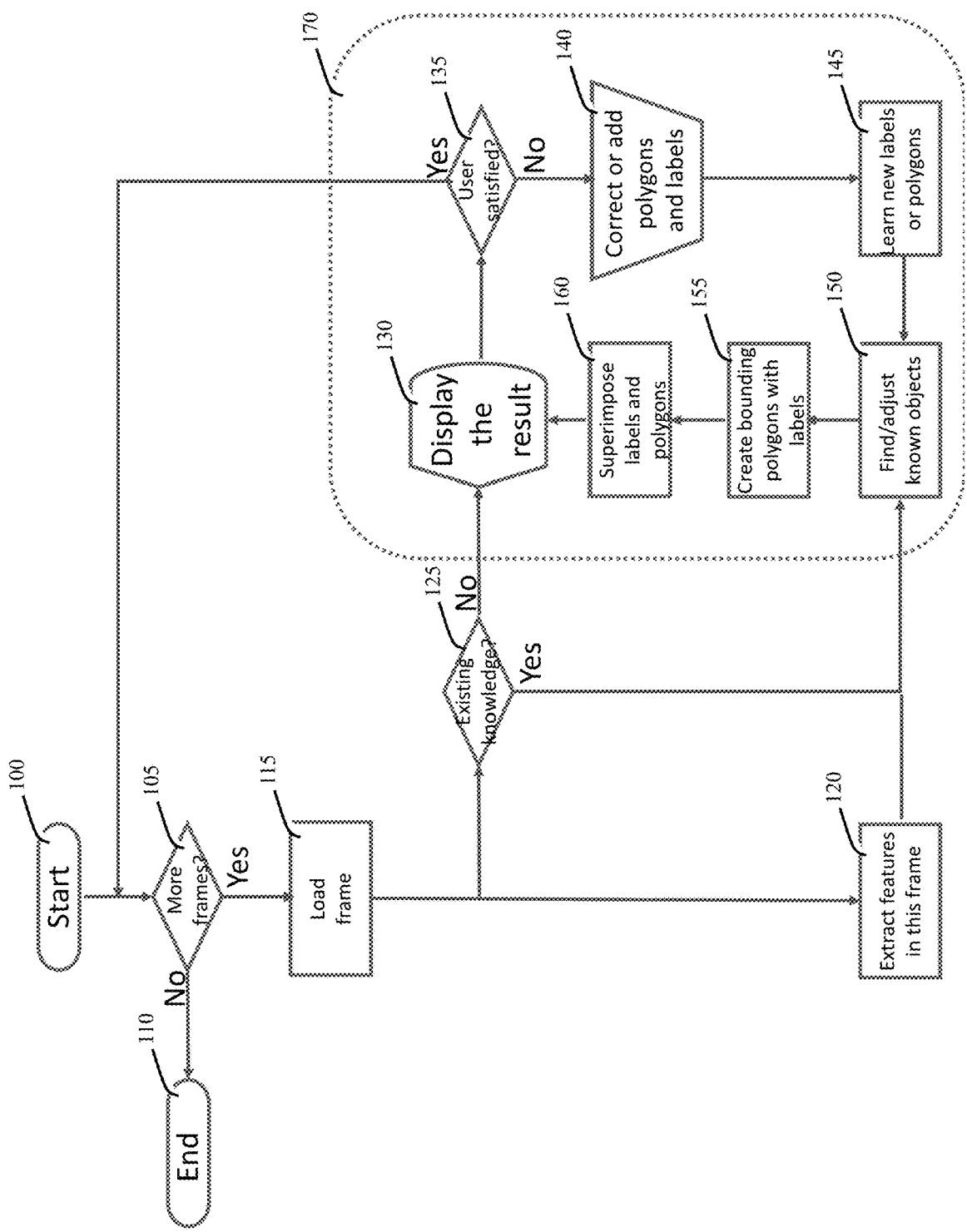
FIG. 1B shows the operational workflow for tagging objects in one or more images (e.g., frames in a video or images in a database) with an inventive smart tagging system.

Process for Incremental Real-Time Learning for Tagging and Labeling Data Streams FIG. 1B shows a flow chart of the operating process of an inventive smart tagging system. In this example the system operates on images, but it can equally well operate on any data that can have human comprehensible 2D representation with distinct objects or areas of interest that should be tagged. The user starts the system (100) and loads a set of images or a video file into the system. In the case of a video file an additional processing step decomposes the video into a sequence of key frames to reduce the number of redundant images. This decomposition can be done automatically by using key frame information encoded in the video file, manually by the user, or both. When the sequence of images is ready the system checks if there are any untagged frames (105) and exits if there are none left (110). If there are frames that should be tagged, the system loads the first frame (115) and performs feature extraction on this frame (120). Put differently, the system loads the first frame and a neural network on one or more processors of the system extracts a convolutional output and creates feature vectors representing features on the first frame. The details of feature extraction implementation are outlined in the corresponding section below.

Simultaneously, the system checks if it has any knowledge already (125). This knowledge may include a set of previously learned associations between extracted feature vectors and corresponding labels. If the previously learned knowledge includes associations between the extracted feature vectors and corresponding labels, a classifier running on one or more processors classifies the extracted feature vectors with respective labels. In order to classify the extracted feature vectors, the system performs feature matching. For instance, the system compares the extracted feature vector to features (and feature vectors) that are already known to the system (e.g., previously learned knowledge). The comparison is performed based on distance metrics (e.g., Euclidean norm in relevant feature space) that measures the distance in feature space between the extracted feature vector and the features that are already known to the system. The system then classifies the object based on the difference. If the difference between the extracted feature and feature for a first object in the system's existing knowledge is less than a threshold, the system classifies the feature as a potential first object. The actual distance or the difference between the distance and the threshold can be or be used to derive a confidence value indicating the quality of the match.

The system can save such knowledge after the tagging session, and this saved knowledge can be loaded by the user in the beginning of new session. This can be especially helpful if the set of images that are currently tagged come from the same domain that the user and the system have tagged before. If no knowledge has been preloaded, the system displays the frame to the user (130) and awaits user input (135). In the case of the first frame with no prior knowledge in the system, the user manually tags one or more instances of the object(s) in the first image (140) via a user interface. When the user tags the first instance of the first object in the image, the system learns the tagged object features and associated label (145). The details of the fast learning classifier involved in this stage are described in the corresponding section below.

After the system has learned the features of a tagged object in a frame, it processes the frame to check whether it can find any other instances of the same object in the frame (150). Note that if the system had preloaded knowledge from the previous sessions, then it can try to find known objects before the first frame is displayed to the user through the same process (150). For instances of the objects that the system has found in the image, the system creates bounding polygons with the attached labels (155), superimposes the bounding polygons on the image (160), and displays the image with superimposed bounding polygons and tags to the user (130). In some instances, if the user is not satisfied with the tag that the system creates, the user can adjust the tag via the user interface. The classifier learns the adjusted tags and updates its knowledge. The inner loop (170) then continues with the user adding new objects and correcting the system predictions until the user is satisfied with the tagging for this frame. When the user is satisfied, the system checks if there are any more frames to tag (105), and if so it loads the next frame (115), runs the feature extraction (120) and reenters the inner loop (170). Note that in this case the system has prior knowledge at least from one previous frame, so the inner loop (170) is entered through the lower branch of the workflow and the system makes predictions (150, 155, 160) before displaying the frame to the user (130).

The whole process continues until the images are tagged or until the user terminates the workflow. Before exiting, the system can save the knowledge acquired from the user in this session so that it can be reused for following sessions.

Operational Procedure from a User Perspective

Figure 2A:
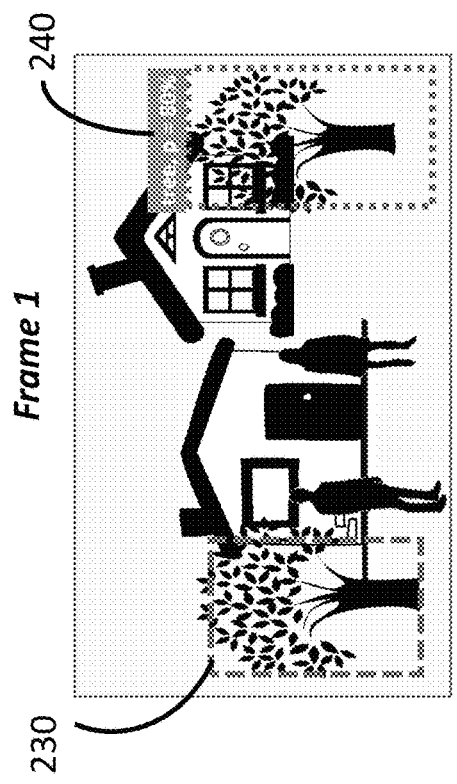
FIGS. 2A-2D illustrate the operational workflow of an inventive smart tagging system from the user perspective.

FIGS. 2A-2D show the operational workflow of FIG. 1B from a user perspective. The system can provide several input modalities, e.g., a mouse (200) or touch screen (210), to the user for control of the system operations and for tagging images as shown in FIG. 2A. The sequence of frames to tag is loaded by the user either as a directory populated with images on a local computer where the system is installed, a remote directory populated with images, a plain text or mark-up document containing local or remote file names for the images, or as one or more video files. In the latter case the videos are split by the system into a sequence of key frames. In any case the system is ready to operate when the sequence of frames to process (220) is defined and the first one is loaded in the system, so that the user sees the image on the screen. If the user so desires, the user can load the trained version of the system described herein to even further speed up the tagging process and reduce the manual part of the task.

Figure 2C:
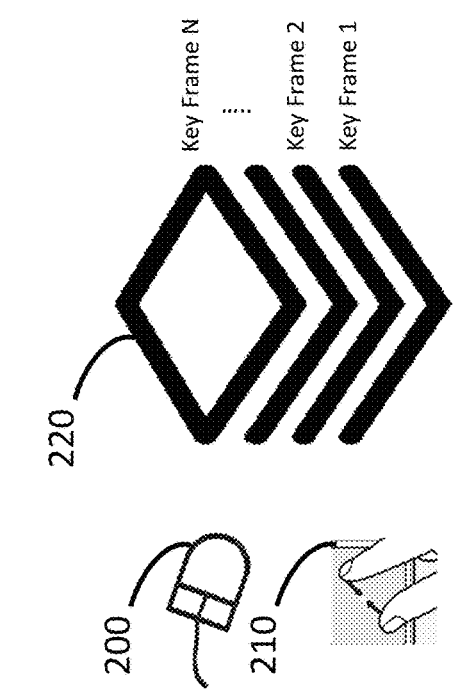
Figure 2B:
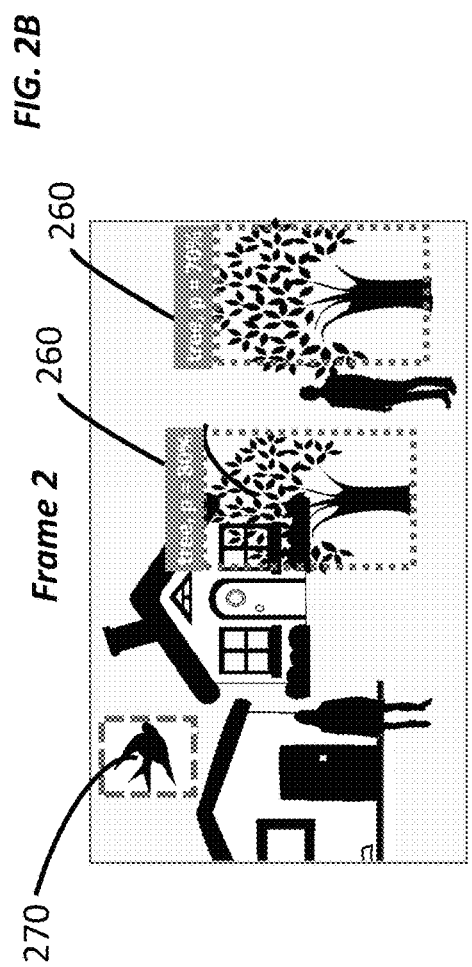
Figure 5:
FIG. 5 shows a screenshot of example implementation after the user corrected the proposal made by the system.

In FIG. 2B, the user selects a tree in frame 1, e.g., with a rectangular bounding box (230). Alternatively, other methods to select candidate regions are possible, e.g., the user can draw polygon as shown in FIGS. 3-5. The system learns the combination of features within the bounding polygon and associates that combination of features with a label (e.g., "Tree") provided by the user. The learning process is a fast learning procedure that completes within 100 ms in the example implementation. Because the process is so fast, the system is able to provide suggestions to the user about other yet untagged instances of the same object in the frame. These suggestions also take under 100 ms to compute in this example implementation, so seamlessly to the user, right after she finishes tagging one object, the system proposes tagging for other instances of the same object in the image (240).

Figure 2D:
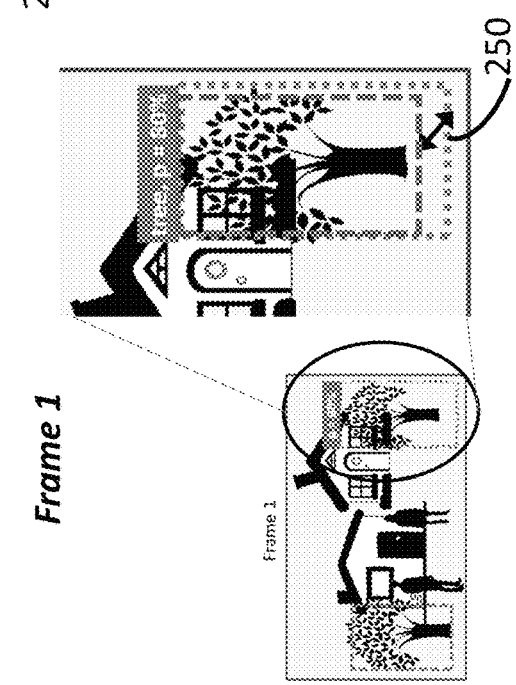

Initially, especially if the previously trained system was not preloaded, the suggestions (240) made by the system may be far from perfect from the user perspective. The user then can reject the predictions that are completely incorrect, adjust labels that are incorrect for correct bounding polygons, adjust the bounding polygons suggested by the classifier for the correct labels as shown in FIG. 2C, and/or accept proposals that are correct. To simplify the process the bounding polygons suggested by the classifier (240, 260) can be displayed in dotted lines, and the user's original tagging (230, 270) and accepted corrections (250) can be displayed in dashed or solid lines as shown in FIGS. 2C and 2D. The accepted corrections constitute another input that can be used by the system to further refine and retrain the specific class of objects to improve further suggestions for tagging.

The process then continues for subsequent frames, as shown in FIG. 2D, where new objects (270) can be tagged by the user, and previously tagged objects (260) can be visualized with their associated classes and confidence values that indicate how confident the system is in its suggestions for the objects it marks on the image. As the system gets more and more trained, the user interactions shift from mainly correcting the suggestions to accepting the suggestions made by the system, which is significantly less labor intensive and much faster than manually tagging images. We observed up to 40% increase in the overall tagging speed on the test dataset for naïve taggers and less drastic but significant increase for professional taggers.

FIGS. 3-5 provide screenshots from a graphical user interface of an example smart tagging system. The user activates a manual tagging tool (300), selects a label from a list of existing labels or creates a new label, and draws a polygon around the first bicyclist (310). The polygon color represents the chosen label in this example. Since this polygon was created manually, it automatically gets approved status (320). The result of these actions is shown in FIG. 3. The smart tagging system's fast classifier then learns the features within polygon (310) and associates them with the user's label for the first bicyclist. Then the system looks at the features across the frame and finds another bicyclist in the image, attempts to create a polygon around it (400), and presents the polygon superimposed on the other bicyclist to the user as shown in FIG. 4. Note that since the polygon is created by the system, it is marked as 'proposed' with the confidence value of the proposition (410). Finally, FIG. 5 shows that the user reactivated the manual correction tool (300), updated the polygon for the second bicyclist (500), which now gets the approved label (510). The user can now tag other objects in the frame if desired, go to the next frame using arrow buttons (530), or finish the session by pressing 'Finished Tagging' button (540).

A Smart Tagging System

Figure 6:
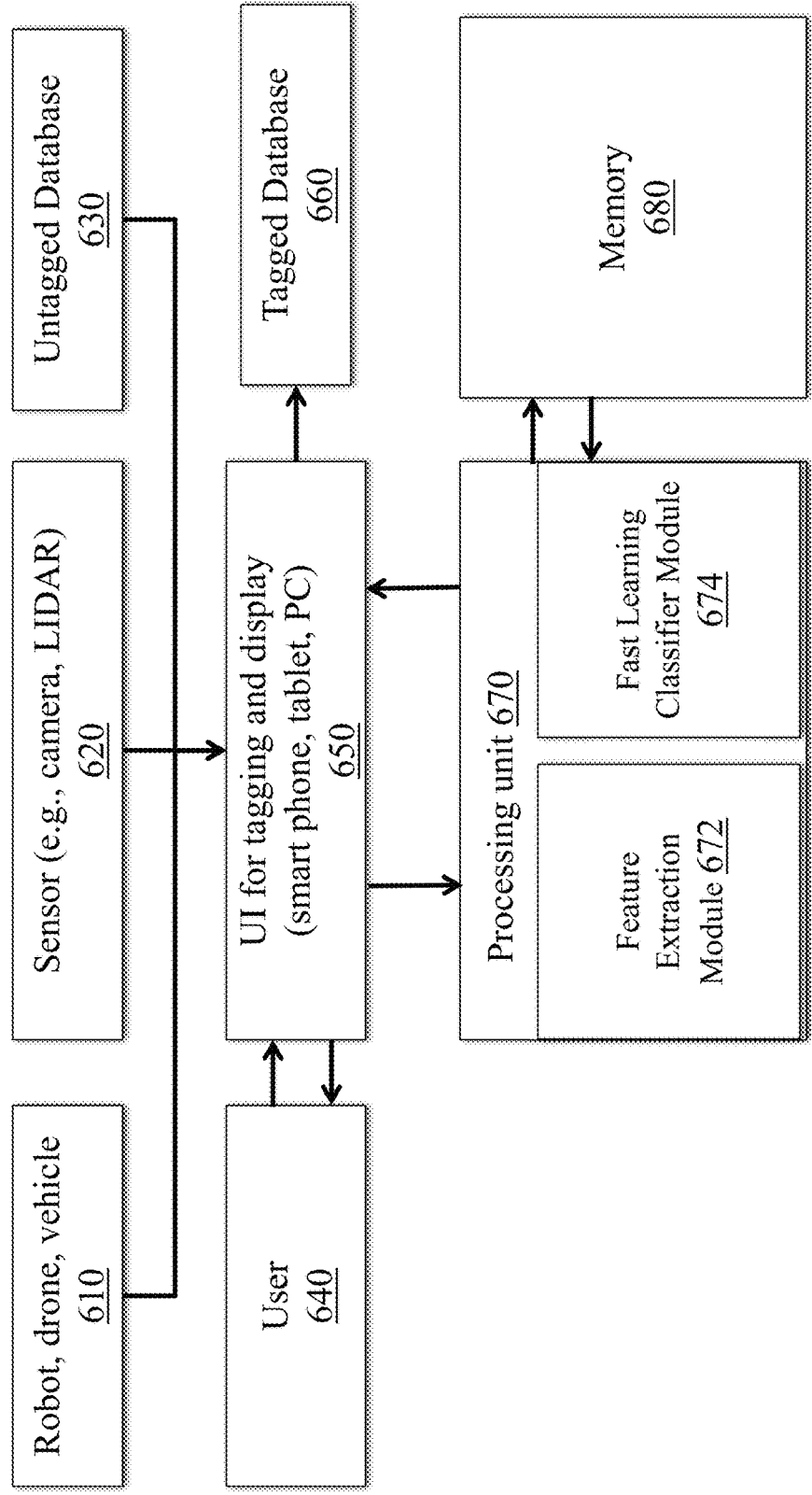
FIG. 6 is a schematic overview of an implementation for a smart tagging utility that is able to automatically tag an object similar to a user-selected object within the same frame or different frames of video or other image data.

FIG. 6 depicts a smart tagging system—a hardware configuration for implementing a smart tagging utility described herein. Sensory information (e.g., RGB, infrared (IR), and/or LIDAR images) is derived from robots, drones, self-driving vehicles, toy robots, industrial robots, and/or other devices (610). Alternative embodiments may derive data from isolated or networked sensors (e.g., cameras, LIDAR 620). In addition, the data may be organized in an existing database (630). The data is transmitted to a computing device equipped with a user interface (650) that the user (640) can use to visualize the data (images), tag the images, visualize the tagged images, and adjust the tags if desired. The computing device can be a mobile device (e.g., smart phone, tablet, laptop), a desktop, or a server, equipped with one or more processors or processing units (670), such as a Digital Signal Processing unit, a Field Programmable Gate Array (FPGA), a Central Processing Unit (CPU), a Graphic Processing Unit (GPU), and/or a combination of these processors sufficient to implement the workflow of FIG. 1B. These processing units (670) may be used to implement the feature extractor and classifier that learns and automatically applies and adjusts the tags. The architecture, comprising several software modules, can be stored in a memory (680) and loaded into the Processing Unit(s) (670) for execution. The tagged images may be visualized in the UI (650) for display to the user (640) and stored in a separate database (660).

Feature Extraction Module

The feature extraction module (120 in FIG. 1, 672 in FIG. 6) is one of the two core components of the automated smart tagging system described herein. It receives an input to the system in its displayed form. For the purpose of visualization in the system's graphical user interface and convenience of tagging, 2D representation of raw external input is preferred, but it does not limit the input modalities to just visual images. Sounds can be represented in 2D after a fast Fourier transform, and other input modalities can be transformed into a 2D representation by other means. Textual inputs can be displayed and fed into the system as text. Advances in 3D displays, like Virtual and Augmented Reality systems, may allow the system to accept and tag 3D data.

The output of the feature extraction module is a set of feature vectors. Depending on the nature of tagging, the set of feature vectors can be either one feature vector per image (in a simple case when the whole image is tagged at once, e.g., for scene recognition) or multiple feature vectors with associated areas of the image where these features are found. These areas can be as simple as rectangular bounding boxes, more complex shaped polygons, or even pixel-wise masks depending on the final goal of tagging process.

The example implementation described herein uses a Deep Convolutional Neural Network for feature extraction. Convolutional neural networks (CNNs) use convolutional units, where the receptive field of the unit's filter (weight vector) is shifted stepwise across the height and width dimensions of the input. Since each filter is small, the number of parameters is greatly reduced compared to fully-connected layers. The application of each filter at different spatial locations in the input provides the appealing property of translation invariance in the following sense: if a set of features can be extracted for an object when it is at one spatial location, the same set of features can be extracted for the same object when it appears in any other spatial location, because the features that comprise the object are independent of the object's spatial location. These invariances provide a feature space in which the encoding of the input has enhanced stability to visual variations, meaning as the input changes (e.g., an object slightly translates and rotates in the image frame), the output values change much less than the input values.

Convolutional Neural Networks are also good at generalization. Generalization means that the network is able to produce similar outputs for test data that are not identical to the trained data, within a trained modality. It takes a large quantity of data to learn the key regularities that define a class-specific set of features. If the network is trained on many classes, lower layers, whose filters are shared among classes, provide a good set of regularities for inputs of the same modality. Thus, a CNN trained on one task can provide excellent results when used as an initialization for other tasks or when lower layers are used as preprocessors for new higher-level representations. For example, natural images share a common set of statistical properties. The learned features at low-layers are fairly class-independent, so they can be reused even if the classes the user is about to tag are not among the classes the CNN was pretrained on. It is sufficient to take these feature vectors and feed them as inputs to the fast learning classifier part of the system (150 in FIG. 1B).

Depending on the target end result of the tagging process, different CNNs can serve as feature extractors. For whole scene recognition, modified versions of Alexnet, GoogLeNet, or ResNet can be used depending on the computational power of the available hardware. An average pooling layer should be added after the last feature layer in these networks to pool across locations in the image and create whole scene feature vectors. If the system is used to create a data set for training detection networks, then the same networks can be used without average pooling, or a region proposal networks like fRCNN can be used instead for better spatial precision. If image segmentation is the target, then segmentation networks like Mask RCNN, FCN, or U-Net can be used for feature extraction and mask generation. These masks can be converted into polygons for display and correction. For the example implementation shown in FIGS. 3-5, a custom version of FCN was used.

Alternative implementations of the feature extraction module can use any suitable technique for feature extraction, including but not limited to: scale invariant feature transform (SIFT), speeded up robust features (SURF), Haar-like feature detectors, dimensionality reductions, component analysis, and others as long as they produce feature vectors that are sufficiently distinct for different objects that the system needs to tag and can operate fast enough so that the user does not wait for a noticeable amount of time while the system computes the feature sets.

Fast-Learning Classifier Module

The fast-learning classifier module (150 in FIG. 1B, 674 in FIG. 6) takes the feature vectors produced by the Feature extraction module (120 in FIG. 1B), performs the classification or feature matching, and outputs a class label for each given set of features. One example implementation can be a simple template matching: the system stores the template feature vectors extracted based on the user input for every known object. When the input set of feature vectors is presented, each of these vectors is compared to template vectors based on some distance metric (e.g., Euclidean norm in the relevant feature space) measuring the difference between the current input and the template. The classifier then marks feature vectors that have a difference metric less than a set threshold as a potential object. The value of the inverse of the distance can serve as a confidence measure in this classification scheme.

Other techniques amenable to fast learning may be substituted in the classifier for this template matching technique, including regression methods (e.g., linear regression, logistic regression, minimax analysis), kernel methods (e.g., support vector machines), Bayesian models, ensemble methods (e.g., ensemble of experts), decision trees (e.g., incremental decision trees, Very Fast Decision Trees and its derivatives), Adaptive Resonance Theory based models (e.g., Fuzzy ARTMAP), and linear discriminative online algorithms (e.g., online passive-aggressive algorithms). For example, the implementation shown in FIGS. 3-5 uses modified ARTMAP for fast learning. The modifications reduce ARTMAP's order dependency, improve statistical consistency, and reduce the growth of the system memory footprint as it learns new objects.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein, the terms "about" and "approximately" generally mean plus or minus 10% of the value stated.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of tagging an object in a data stream, the method comprising:
   extracting, with a neural network running on at least one processor, a first convolutional output from the data stream representing features of a first representation of an object in a first category;
   classifying, with a classifier operably coupled to the neural network, the first representation of the object into the first category based on the first convolutional output;
   tagging, by the at least one processor, the first representation of the object with a first tag;
   displaying, via a user interface operably coupled to the classifier, the first tag and/or an indication of a position for the first representation of the object based on the first category;
   performing an adjustment, by a user via the user interface, of the first tag and/or the indication of the position for the first representation of the object;
   learning, by the classifier, the first tag and/or the indication of the position of the first representation of the object based on the adjustment without retraining the classifier on other categories of objects previously learned by the classifier; and
   tagging, by the at least one processor based on the adjustment and learning, a second representation of an object in the first category present in the data stream along with the first representation of the object in the first category.

2. The method of claim 1, wherein and the position is a first position and further comprising:
   extracting, with the neural network, a second convolutional output from the data stream, the second convolutional output representing features of the second representation of the object in the first category;
   classifying, with the classifier, the second representation of the object into the first category based on the second convolutional output and the adjustment of the first tag and/or the indication of the position for the first representation of the object; and
   displaying, via the user interface, a second tag and/or an indication of a second position of the second representation.

3. The method of claim 1, further comprising:
determining, with the classifier, a confidence value that the first tag and/or indication of the position of the first representation of the object are correct; and
displaying the confidence value to the user.

4. The method of claim 1, wherein the object is a first object, and further comprising:
learning, by the classifier, a second tag for a second category of an object, the data stream including at least one representation of the object in the second category.

5. The method of claim 4, further comprising:
extracting, with the neural network, a subsequent convolutional output from a subsequent data stream, the subsequent data stream including at least one other representation of the object in the second category, the subsequent convolutional output representing features of the at least one other representation of the object in the second category;
classifying, with the classifier, the at least one other representation of the object in the second category into the second category based on the subsequent convolutional output and the second tag; and
displaying, via the user interface, the second tag.

6. The method of claim 5, wherein extracting the first convolutional output comprises:
generating a plurality of segmented sub-areas of a first image in the data stream; and
encoding, by the neural network, each of the plurality of segmented sub-areas.

7. The method of claim 1, wherein extracting the first convolutional output comprises applying a filter to different locations within the data stream.

8. The method of claim 1, wherein the neural network is a convolutional neural network and extracting the first convolutional output comprises sharing filters that are trained on many categories among lower layers of the convolutional neural network.

9. The method of claim 1, wherein the first convolutional output includes a feature vector and classifying the first representation of the object into the first category comprises comparing the feature vector to previously extracted feature vectors.

10. The method of claim 1, wherein classifying the first representation of the object into the first category further comprises generating a distribution of probabilities associated with a hierarchy of classes of objects.

11. The method of claim 1, further comprising:
automatically proposing, by the classifier, tags for other representations of objects in the first category in the data stream based in part on learning the tag and/or the indication of the position of the first representation of the object.

12. A system, comprising:
at least one processor configured to implement:
a neural network to extract a first convolutional output and a second convolutional output from a data stream, the data stream including at least two representations of an object in a first category, the first convolutional output representing features of a first representation of the object in the first category, and the second convolutional output representing features of a second representation of the object in the first category; and
a fast-learning module to classify the first representation of the object into the first category based on the first convolutional output and to learn a first tag and/or an indication of a position of the first representation of the object based on an adjustment by a user without being retrained on other categories of objects previously learned by the fast-learning module and to tag the second representation of the object based on a comparison of the first convolutional output and an adjustment of the second representation of the object; and
a user interface, operably coupled to the at least one processor, to display a second tag and/or an indication of the position for the second representation of the object created by the at least one processor and to enable the user to perform the adjustment of the second tag and/or the indication of the position of the second representation of the object.

13. The system of claim 12, wherein:
the fast-learning module is configured to determine a confidence value that the first and second tag and/or the indication of the position of the object are correct; and
the user interface is further configured to display the confidence value to the user.

14. The system of claim 12, wherein the fast-learning module is further configured to learn a second category without being retrained on the first category, the data stream including at least one representation of an object in the second category.

15. The system of claim 14, wherein:
the neural network is further configured to extract a subsequent convolutional output from a subsequent data stream, the subsequent data stream including at least one other representation of an object in the second category, the subsequent convolutional output representing features of the at least one representation of the object of the second category of object;
the fast-learning module is further configured to classify the at least one other representation of the object of the second category into the second category based on the subsequent convolutional output and the second tag.

16. The system of claim 12, wherein the neural network is further configured to:
generate a plurality of segmented sub-areas of a first image in the data stream; and
encode each of the plurality of segmented sub-areas.

17. The system of claim 12, wherein the neural network is a convolutional neural network comprising filters that are trained on many categories and shared among lower layers of the convolutional neural network.

\* \* \* \* \*